May 4, 1965  J. O. SMITH  3,181,972
NITROL COMPOUNDS AS DEPOLARIZERS
Filed Feb. 5, 1963  2 Sheets-Sheet 2

J. O. SMITH
INVENTOR.

BY Lorna A. Ferris
ATTORNEY.

United States Patent Office 3,181,972
Patented May 4, 1965

3,181,972
NITROL COMPOUNDS AS DEPOLARIZERS
John O. Smith, Swampscott, Mass., assignor to Monsanto Research Corporation, St. Louis, Mo., a corporation of Delaware
Filed Feb. 5, 1963, Ser. No. 256,473
4 Claims. (Cl. 136—90)

This invention relates to depolarizers, and more particularly, provides novel primary cell systems comprising organic cathode depolarizers.

In primary voltaic cells of the kind to which this invention relates, the anode includes a metal high in the electromotive series and the cathode section includes a reducible chemical compound. When the cell is connected into a completed electrical circuit, electron flow proceeds with oxidation of the stated anodic metal, converting it to metal ions, and reduction of the stated cathodic chemical compound. In the cathode section of the cell, current collection is usually accomplished by an inert conductor, such as a graphite rod, which is contacted by a mixture of an electronically conducting material such as carbon black and the stated reducible cathode compound. This reducible chemical compound, actively participating in the electrochemical energy conversion effected in the cell, is designated the cathode depolarizer.

Advantages including a high yield of electrical energy per weight of cathode depolarizer compound put into the cell make organic cathode depolarizers a desirable substitute for the conventional metal oxide depolarizers. The proportion of the weight of reducible group or position to the total molecular weight of reducible compound can be maximized in organic compounds. The atomic weight of manganese, the metal in the most commonly used metal oxide depolarizer, is 55, compared to the $CH_2$ unit weight of 14; and organic compounds can contain multiple substituents, so that the proportion of carbon atom backbone to reducible functional positions is kept low. Additionally, the number of electrons involved in reduction of a single group can be increased. In manganese dioxide, the reduction occurring appears to be conversion of oxide to hydroxide, involving a 2 electron change. With organic compounds, the reduction can proceed further: for example, a dioxide group, the nitro substituent, can be reduced all the way to a "dihydride," the amino group, involving a 6 electron change. Assuming reduction of organic compounds to proceed to completion, from the free energy of formation of reactants and products, maximum electrochemical capacities can be calculated to show that organic depolarizers are theoretically capable of attaining highly advantageous power to weight ratios.

A number of factors affect cathode depolarizer performance. Qualities of the electrolyte such as pH may be important. The reducible compound may react chemically with species in the electrolyte in preference to participating in the electrochemical reaction. Hydrolysis by the electrolyte may occur. Ease of electrochemical reduction can be affected by the structural environment of reducible groups, through steric hindrance and through the presence of electronegative or electropositive substituents. A primary cell is usually a non-invariant system, in which reaction products accumulate, changing the composition of the system continually. Initial depolarizer activity usually ceases long before complete reduction of the depolarizer supply, which can be explained as the effects of accumulated products, changes in pH, and the like. When the current drain rate increases, still further limiting factors come into play. Rate of solution can control performance, one of the steps in a multistep reduction can be slow and rate-limiting, and so forth.

It is an object of this invention to provide novel electrochemical systems having advantageous properties for primary cells.

A particular object of this invention is to provide novel primary cell electrochemical systems which comprise an organic cathode depolarizer having unusually advantageous performance properties.

These and other objects will become evident on a consideration of the following specification and claims.

It has now been found that nitrol compounds selected from nitrolic acids and pseudonitroles can advantageously be employed as organic cathode depolarizers in primary cell systems.

Understanding of the invention will be facilitated by a consideration of the drawings, in which.

Figure 1:
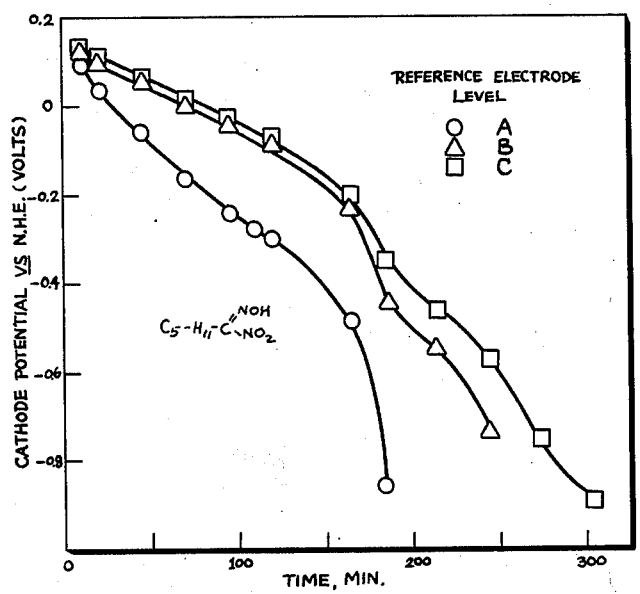
FIGURE 1 illustrates closed circuit voltage characteristics of capronitrolic acid.

The nitrolic acids and pseudonitroles are materials having high free energies of formation, which have a structure wherein two oxygenated nitrogen substituent groups are substituted on a single carbon atom. The nitrolic acids are of the formula

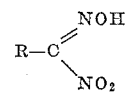

and the pseudonitroles of the formula

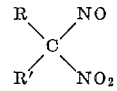

where R and R' are organic substituents such as alkyl groups.

The potential developed by compounds of this class is unusually high. Under load, at useful current drain rates, operating voltages of these nitrol compounds is unexpectedly significantly higher than the operating voltage of a dinitro compound. Moreover, a particularly valuable and unusual quality of systems comprising a nitrol compound as depolarizer is that the operating voltage remains substantially unchanged over long periods of time, under such current drains. Moreover, the steady high operating voltage does not drop off at higher current drains.

In the primary cell systems provided in accordance with this invention, the anode will be a metal of Groups II and III of the Periodic Table which is high in the electromotive series, such as zinc, cadmium, magnesium and aluminum. Systems comprising magnesium as the anode metal can be prepared with the presently employed cathode depolarizer materials which are particularly advantageous in minimizing power-to-weight ratios. In referring to anode metal, it is intended to include not only the pure metal, but also various alloys thereof. Properties of the stated Group II and III metals such as ease of fabrication, corrosion resistance and the like are frequently improved by alloying the metal with small amounts of other metallic materials. In such alloys, the electrochemically active metal will comprise at least about 50% by weight of the total alloy weight, and more usually, above about 90% by weight of the total. The anode metal may be a combination of more than one of the above named anode metals.

The cathode will include a depolarizer comprising a nitrol compound selected from a nitrolic acid and a pseudonitrole. The nitrolic acids and pseudonitroles are readily prepared by treatment of the corresponding primary and secondary nitro compounds with nascent nitrous acid; and other synthetic methods are also available. The organic substituent attached to the nitrol functional group (—C(=NOH)NO$_2$ for a nitrolic acid;

$$>C(NO)NO_2$$

for a pseudonitrole) may be aliphatic or aromatic saturated or unsaturated, hydrocarbon or substituted hydrocarbon radicals, where the substituents of the stated hydrocarbon radicals may be, for example, such non-interfering substituents as another nitrol functional group, and electronegative substituents such as a chloro radical, a cyano radical, an acyl (alkylcarbonyl) radical, an acyloxy radical, or a carboalkoxy radical where alkyl is, for example, aliphatic saturated hydrocarbon, and so forth. Generally the stated organic substituents will preferably contain from 1 to 12 carbon atoms, and more preferably from 1 to 6 carbon atoms. The lower alkyl hydrocarbon (1 to 6 carbon atoms) nitrolic acids are especially preferred depolarizers in accordance with this invention. Thus, nitrol compounds which may be provided for use in the practice of this invention include, for example, aliphatic hydrocarbyl nitrolic acids such as acetonitrolic acid, propionitrolic acid, butyronitrolic acid, valeronitrolic acid, capronitrolic acid, enanthonitrolic acid, caprylonitrolic acid, pelargonitrolic acid, pivalonitrolic acid, lauronitrolic acid, and so forth, as well as reaction products of primary nitroalkyl substituted aromatic hydrocarbons, such as benzonitrolic acid, 2-phenylacetonitrolic acid, and so forth. There may also be employed dinitrolic acids such as malononitrolic acid and unsaturated acids such as 1-cyclohexeneacetonitrolic acid. These nitrolic acids will further include functionally substituted derivatives such as 4-carboxybutyronitrolic acid, 3-carbomethoxypropionitrolic acid, 2-propionoxyacetonitrolic acid, 3-acetyl-2,2-dimethylpropionitrolic acid, 3-carbethoxy-2-methylpropionitrolic acid, 4-cyanobutyronitrolic acid, 2-cyano-2-methylpropionitrolic acid, and the like.

The pseudonitroles derivable from available nitro compounds and useable in the present systems include for example isopropyl pseudonitrole, 1-chloroethyl pseudonitrole, 1,2,3 - trimethyl - 1,3 - propylene dipseudonitrole, 4 - carboxy - 2 - butyl pseudonitrole, bis(carbomethoxy)-methyl pseudonitrole, cyanoisopropyl pseudonitrole, 1-cyano-1-methylisopropyl pseudonitrole, 2-cyano-3-methyl-4-pentyl pseudonitrole, and the like.

The presently employed nitrol compound depolarizer materials may be employed individually, in admixture with one another, or associated with other cathode depolarizer materials. The latter may be other organic depolarizers such as a dinitrobenzene, or inorganic, like manganese dioxide. It can be shown that in mixtures, cathode depolarizers can exert their depolarizing effects individually and essentially independently, in order of decreasing discharge voltages. Thus beneficial effects of cathode depolarizers as employed in accordance with this invention can be obtained when they constitute a minor proportion of the total depolarizer content, but sufficient to produce discharge at their characteristic operating voltages constituting a significant proportion, such as at least about 10% of the power output of the cell. Such compositions are intended to be included herein in the class of depolarizer compositions consisting essentially of nitrol compound cathode depolarizers as contemplated by the present invention.

A further requirement of a primary cell system in accordance with this invention is a means of providing ionic while excluding electronic contact between anode metal and cathode depolarizer. This may be a fluid electrolyte with the latter preferably provided in a bibulous separator permeated by the electrolyte.

The ionized solute in the electrolyte may be generated as the cell is operated. Thus the fluid electrolyte as introduced may consist essentially of a fluid capable of acting as an ion transport medium, such as tap or distilled water, where the action of the cell is such as to produce salt-forming ions in operation, since the ions so formed can act as the electrolytically conductive solute. Usually, it will be advantageous to introduce a soluble ionizable salt into the electrolyte fluid initially to provide for immediate ionic conductance in operation of the cell. The cation of the ionizable salt may be an alkali metal such as lithium, sodium or potassium, an alkaline earth metal such as magnesium, zinc, strontium, cadmium or barium, or a nonmetallic ion such as the ammonium ion. The anion of the salt may be a halide such as chloride, bromide and the like, an oxyhalide such as perchlorate, and so forth. Usual electrolyte solutes such as ammonium bromide can be employed to good effect in the primary cell systems of this invention.

The solvent employed to produce the fluid electrolyte may be water, or alternatively, this may be an ionizing organic solvent. The ionizing organic solvents are those with dielectric constants at least $\frac{1}{10}$ of that of water, such as dimethylformamide, dimethylsulfoxide and the like.

Bibulous separators which may be permeated by the stated fluid electrolytes may comprise porous cellulosic materials like absorbent paper such as kraft paper, woven materials such as cotton fabrics, gel-like materials such as carboxymethyl cellulose, a starch gel and so forth, alone or in combination. Useful starch gels are prepared by combining starch or a mixture of starch and a cereal flour such as wheat flour with the fluid electrolyte, following which gelatinization may be produced by action of the electrolyte, by heating, and so forth. Other porous organic materials such as films of a plastic like porous polyethylene or inorganic porous products such as ceramics or glass can be used. Ion exchange membranes may also be used as separators, in which case the separator itself may perform the functions both of separator and of electrolyte. Ion exchange membrane separators are particularly contemplated as useful where the primary cell systems of this invention are embodied in a fuel cell construction, especially the tape separator fed fuel cell system as provided in copending application S.N. 232,144, filed October 22, 1962, by Bernard A. Gruber, the description of which is incorporated herein by reference.

The present invention may be practiced in primary cell embodiments of either the dry or reserve cell type. In reserve cells, one component, usually the electrolyte, is kept separate from the remainder of the system until just prior to use of the cell. Reserve cells constitute an especially preferred embodiment of the invention. Where a dry cell construction is used, in which the primary cell system components are maintained in contact over a period of time prior to imposition of current drain, the electrolyte may advantageously contain corrosion inhibitors to protect the anode metal. Exemplary of these inhibitors are the inorganic salts such as barium chromate, mixtures of barium chromate with lithium chromate and the like, organic inhibitors such as 8-chloroquinoline, and so forth.

The anode metal may be in the form of a powder, film, or sheet of sufficient thickness to possess structural rigidity. Physical configurations of anode metal sheets may be those of conventional primary cell structures such as sheets where flat cell constructions are used and cups serving as containers for the cathodic portion of the cell for round cell constructions. Leads may be provided for connecting the anode metal to complete the electrical circuit in employing the cell system, or direct contact can be made with an exterior face of the anode structure for this purpose.

The cathode depolarizer is usually a poor electrical conductor, and is associated in the cathode structure with additional cathode components, including particularly a cathode current collector. The stated current collector will provide a means of making an electrical connection to the cathode depolarizer to complete an external circuit, and is usually a coherent structure possessing electrical conductivity made of a substance which is desirably an inert conductive material such as conductive carbon. A conductive graphite rod or bar is suitable. In the bulk of the cathode depolarizer mass contacting the stated current collector, the cathode depolarizer is associated with an electronically conductive, inert particulate material distributed throughout the mass. This conductive material will normally be a conductive carbon of the kind known as a battery black. Generally this is a black produced by pyrolysis of an unsaturated carbon compound, such as an acetylene black. The ratio of conductive carbon to cathode depolarizer may vary, for example, between 90:10 and 10:90 (by weight), but is generally about 50:50. The cathode depolarizer, which as stated will usually be associated with conductive carbon particles in a mixture designated the cathode mix, may also have admixed therewith electrolyte solution permeating the cathode mix, additional cathode depolarizer materials, binders such as polyvinyl alcohol, and so forth.

The invention is illustrated but not limited by the following examples.

*Example 1*

This example describes measurement of the potential of a cathode depolarizer employed in the systems of this invention, referred to the normal hydrogen electrode.

The following is a description of test equipment designated Cell C.

Experimental apparatus for half cell measurements is thermostated at 30° C. A mixture of 0.5 gram (g.) of the depolarizer with 0.25 g. of carbon is placed on a fritted disc support in a round glass tube 1.22 square inches in area. The tube is filled from above the depolarizer mixture to below the disc with electrolyte. A graphite pressure disc is placed over the cathode mix to provide electrical contact between the mix and the graphite rod to which external connections are made. A 550 gram weight is attached to the graphite rod to insure reproducible contact of the graphite with the cathode cake. A counter-electrode consisting of a carbon rod about ½ inch in diameter is immersed to a depth of about 5 inches in the electrolyte solution contacting the bottom of the fritted disc, and a saurated calomel electrode is immersed in the electrolyte contacting the pressure disc above the cathode mix. Electrical connections are made to the counter electrode, the graphite rod contacting the pressure disc, and the saturated calomel electrode. The cathode is driven by lead-acid storage batteries connected in series, which are in series with a milliammeter and a variable resistance. A voltmeter is included in the circuit between the calomel electrode and the working electrode.

In the above-described cell, a current drain rate of 0.1 ampere corresponds to a current density of 0.08 ampere per square inch.

Using a mixture of 0.5 gram (g.) of depolarizer with 0.25 g. of Shawinigan acetylene black, employing an aqueous solution of 168 g. per liter ammonium bromide as electrolyte, it is found that the nitrolic acids, acetonitrolic acid and capronitrolic acid, each develop an initial operating potential of close to +0.1 volt (against normal hydrogen electrode). The initial operating potential of isopropyl pseudonitrole is −0.2 volt.

*Example 2*

Figure 2:
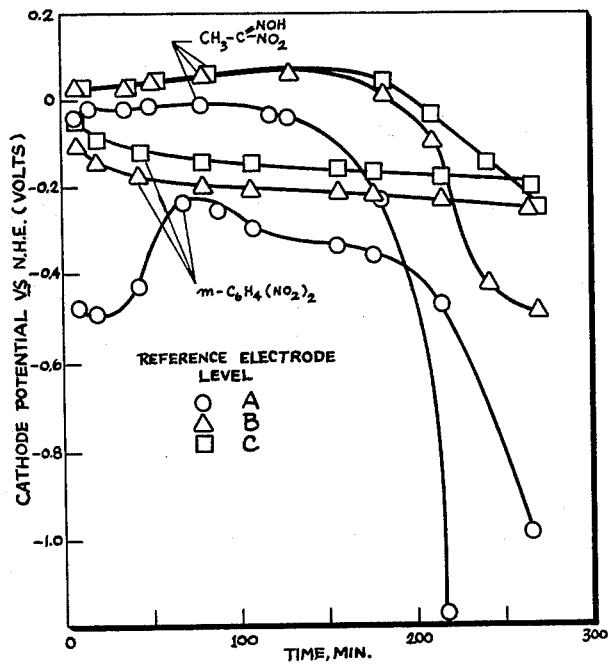
FIGURE 2 illustrates closed circuit voltage characteristics of acetonitrolic acid, compared to those of a nitro organic depolarizer under the same conditions.

This example describes measurements of potentials as illustrated in FIGURES 1 and 2.

The equipment used, which is designated Cell D, is like that described above for Cell C except in the following particulars. The mix, surmounted by the weighted graphite piston, rests on a cation exchange membrane below which the counter electrode is positioned. The volume of electrolyte introduced is just enough to wet the cathode slug from top to bottom. The cell consists of a methacrylate polymeric body with calomel reference electrode openings to the cathode compartment provided at three different levels so that potentials can be determined as a function of distance from the anode. The A level is at the bottom of the cake (high current density) while the B and C values are taken at the top of and just above the cake (lower current density).

At 0.025 ampere in Cell D, with approximately 0.2 sq. inch area, the projected average area current density is 0.127 ampere per square inch.

The charge used in measuring the potentials plotted in FIGURES 1 and 2 was a mixture of 0.5 g. of the nitrogenous compound and 0.25 g. of Shawinigan acetylene black, and the electrolyte was an aqueous solution of 168 g. per liter ammonium bromide.

With a current drain rate of 0.05 ampere per gram in this cell, capronitrolic acid develops a potential of above +0.1 volt (against normal hydrogen electrode), measured at all levels of the cell. More than 5 hours' elapse before the operating voltage has dropped to the cut-off point of −0.9 volt, as appears in the chronopotentiometric plot identified as FIGURE 1.

FIGURE 2 is a chronopotentiometric plot of potential (against normal hydrogen electrode) plotted against time at a drain rate of 0.05 ampere per gram for acetonitrolic acid and for a nitro aromatic depolarizer, m-dinitrobenzene. In each case, the data were measured using a charge of 0.5 g. of depolarizer and 0.25 g. of Shawinigan acetylene black, and the electrolyte was an ammonium bromide solution as described above.

As appears in FIGURE 2, the potential developed by the nitrol compound is generally higher than that of meta-dinitrobenzene over the first 200–300 minutes of operating time. The voltage measured at all levels remains substantially constant at over two hundred minutes.

*Example 3*

Figure 3:
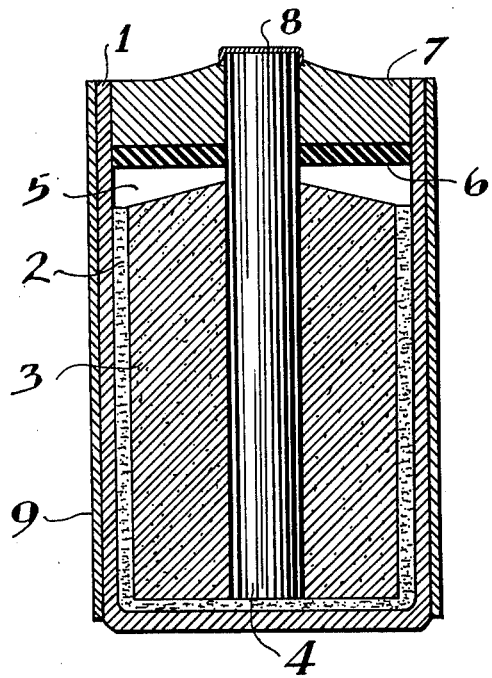
FIGURE 3 is a cross-sectional view of a dry cell in accordance with the invention.

This example illustrates an exemplary embodiment of the cell system of the present invention in which the cathode depolarizer is coupled with an anode metal through an electrolyte, as illustrated in FIGURE 3.

FIGURE 3 is a diagrammatic illustration of a vertical section of a dry cell prepared in accordance with the invention, in which 1 is a cup of magnesium, 2 is a separator made of porous material such as kraft paper lining the interior of the cup, and 3 is a cathode mix prepared by combining acetylene carbon black particles, and a nitrol compound in a depolarizing amount. For example, this may be a 50:50 by weight mixture of acetonitrolic acid and acetylene black. The paper separator and the cathode mix are permeated by a liquid electrolyte, which may be, for example, an aqueous solution saturated with barium chromate, containing a concentration of one gram per liter of lithium chromate, and having dissolved therein ammonium bromide, as an electrolyte, in a concentration of 168 grams per liter. Centrally located in the cell, and prevented from contacting the exterior can 1 by the separator 2 is a carbon rod 4 which is the cathode current collector. An air space 5 above the top of the cathode mix intervenes between it and an insulating washer 6 and a seal 7 over the top of the cell. A cap 8 provides electrical connection to the cathode current collector 4, and a jacket 9 covering the exterior of the can 1 insulates it from contact on the can sides while leaving the bottom free for making electrical contact.

Connection of the cell system is made, by a cathode lead attached to the cap 8 and an anode lead contacting the bottom of the can 1, into a completed electrical circuit (not shown) in which the current generated is passed through a resistance. The magnesium-acetonitrolic acid above-described system generates a potential of 1.4 volts, which is sustained as current drain is continued.

Example 4

Figure 4:
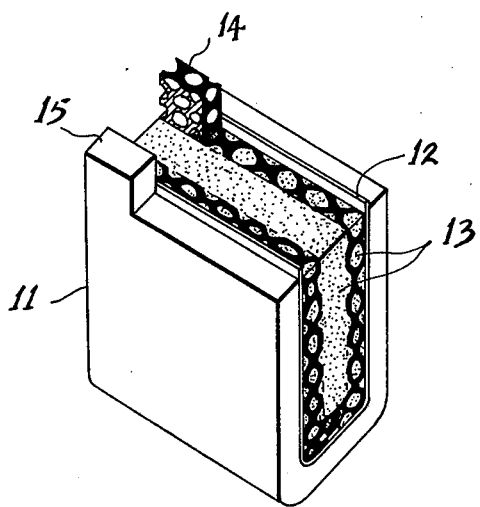
FIGURE 4 is a perspective view of a reserve cell in accordance with the invention.

This example illustrates the embodiment of the cell system of this invention in a reserve cell, as illustrated in FIGURE 4.

An external open-sided jacket 11 of magnesium is lined internally by a porous separator 12 made of kraft paper, and centrally positioned is a rectangular cathode mix block 13 of a mix of acetylene black and acetonitrolic acid. Embedded in the stated cathode mix is a mesh of titanium gauze having a tab 14 extending externally, providing means for cathode connection to the cell. A tab 15 integrally joined with the external magnesium jacket 11 provides an anode connection.

To operate this cell, it is immersed in an electrolyte comprising an aqueous solution of ammonium bromide and connected to a completed electrical circuit (not shown). The operating characteristics are like those of the dry cell of Example 3.

Example 5

This example describes the preparation of nitrol compounds.

A solution of 0.2 mole nitroethane, 0.22 mole sodium hydroxide and 0.22 mole sodium nitrite in 90 milliliters (ml.) water, cooled to $-5°$ C., is maintained at between $-5°$ C. and $+2°$ C. while 150 ml. of 30% HCl is slowly added. The oily solid which separates is taken up in ether and the ether solution is dried over magnesium sulfate, filtered, and evaporated down to provide acetonitrolic acid as a solid residue. This is purified by recrystallization from ethyl ether and from ethyl ether/petroleum ether, providing acetonitrolic acid as white plates, M. 89° C.

The procedure used for the preparation of acetonitrolic acid from nitroethane is carried out substituting 0.2 mole nitrohexane. A little ethanol is added to the aqueous sodium hydroxide solution to obtain solution of 1-nitrohexane before the reaction with nascent nitrous acid. The product separates as an oil from the reaction mixture: extraction with ether, drying, and filtering under evaporation produces a pale yellow oil which is capronitrolic acid. The oil is purified by dissolving in dilute sodium hydroxide and extracting with ether to remove neutral compounds, followed by acidification of the raffinate, and final extraction with ether, drying, and evaporation of the ether. The product is an oil which is essentially insoluble in water.

The procedure used to prepare propyl pseudonitrole comprises reaction of 2-nitropropane with hot aqueous sodium hydroxide followed by neutralization with hydrochloric acid, using the procedure of Nygaard et al., U.S. 2,370,185. In this procedure, oxygen of the air serves to oxidize the sodium salt of a nitro compound to acetone and sodium nitrite, which then reacts with another molecule of the nitro compound to form the sodium salt of a pseudonitrole. The product, which is the dimer, is isolated by ether extraction of the reaction mixture. It is a solid, M. 75° C.

While the invention has been described with reference to various specific preferred embodiments thereof, it is to be appreciated that modifications and variations can be made without departing from the scope of the invention, which is limited only as defined in the appended claims.

What is claimed is:

1. A primary cell having an anode formed by a metal standing high in the electromotive series, in combination with a cathode including a depolarizer consisting of a nitrol compound selected from the class consisting of nitrolic acids and pseudonitroles.

2. The cell of claim 1 wherein said depolarizer is an aliphatic nitrolic acid.

3. The cell of claim 1 wherein said nitrol compound is acetonitrolic acid.

4. The cell of claim 1 wherein said depolarizer is acetonitrolic acid and wherein said anode metal is magnesium.

References Cited by the Examiner
UNITED STATES PATENTS
2,993,946  7/61  Lozier _____ 136—90

JOHN H. MACK, *Primary Examiner.*

MURRAY TILLMAN, *Examiner.*